United States Patent [19]
Hodkinson

[11] Patent Number: 5,373,422
[45] Date of Patent: Dec. 13, 1994

[54] LIGHT PANELS

[76] Inventor: John M. Hodkinson, 44 Lismore Drive, Harborne, Birmingham B17 OTP, England

[21] Appl. No.: 14,655

[22] Filed: Feb. 8, 1993

[30] Foreign Application Priority Data

Feb. 13, 1992 [GB] United Kingdom ............... 9203041

[51] Int. Cl.$^5$ ............................................. G03B 15/02
[52] U.S. Cl. ..................................... 362/18; 354/291; 362/449
[58] Field of Search .................. 354/291; 362/16, 18, 362/319, 341, 449, 450; 359/443, 459

[56] References Cited

U.S. PATENT DOCUMENTS

| | | | |
|---|---|---|---|
| 4,340,293 | 7/1982 | Russotti | 354/291 |
| 4,428,030 | 1/1984 | Baliozian | 362/18 |
| 4,524,405 | 6/1985 | Heard | 362/449 X |
| 4,872,031 | 10/1989 | Baliozian | 354/291 |
| 5,067,049 | 11/1991 | Milaire | 362/18 |

OTHER PUBLICATIONS

Lightform; Modular Luminance Systems, Lightform, San Diego, Calif. (date unknown).

Primary Examiner—Stephen F. Husar
Attorney, Agent, or Firm—Ware, Fressola, Van Der Sluys & Adolphson

[57] ABSTRACT

A light panel as used by photographers comprises a framework and a fabric sheet attached releasably to the framework. The framework is produced by interconnecting a plurality of elongated frame members provided at their ends with jointing elements of annular form which can be coupled in face-to-face relationship in a plurality of relative angular configurations. Plugs are fitted in the aligned bores of the jointing elements; the plugs include spring-loaded push-buttons which are pressed to permit separation of the coupled jointing elements.

10 Claims, 3 Drawing Sheets

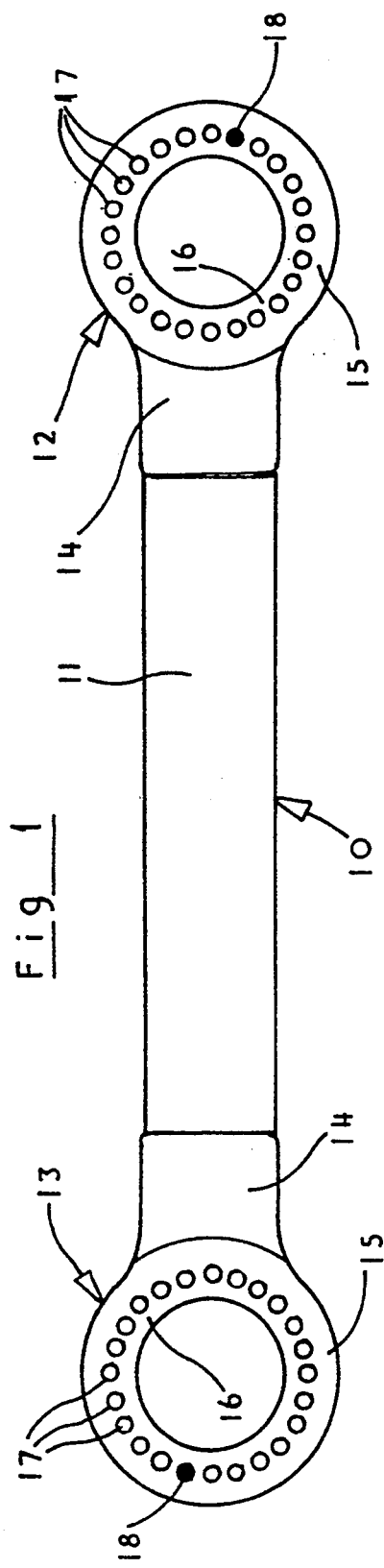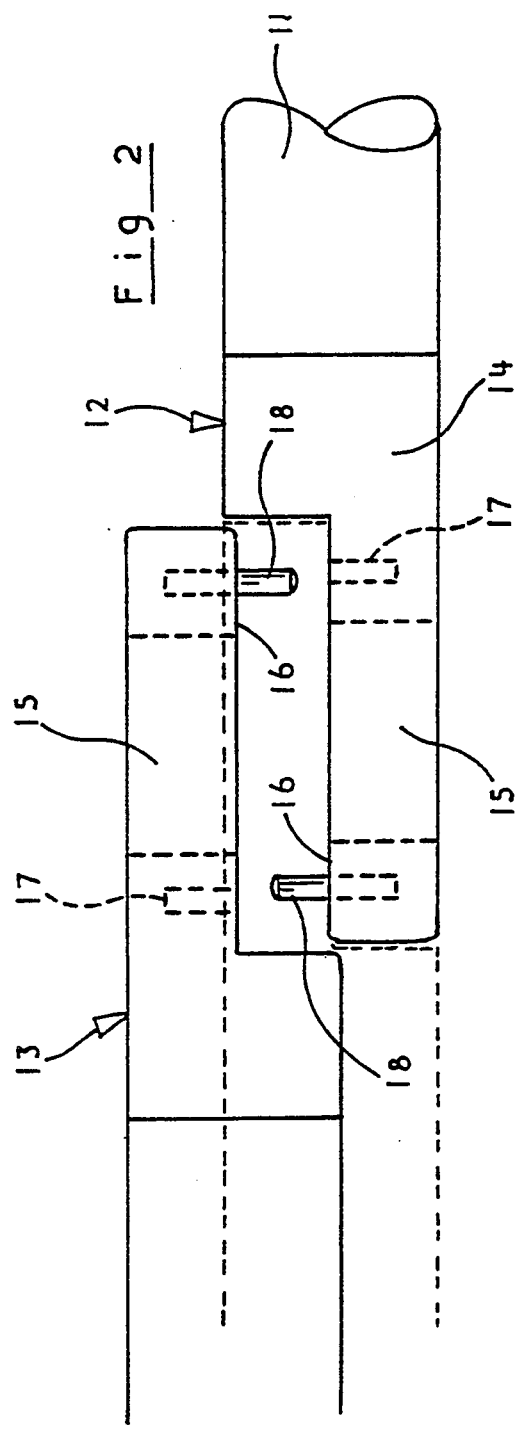

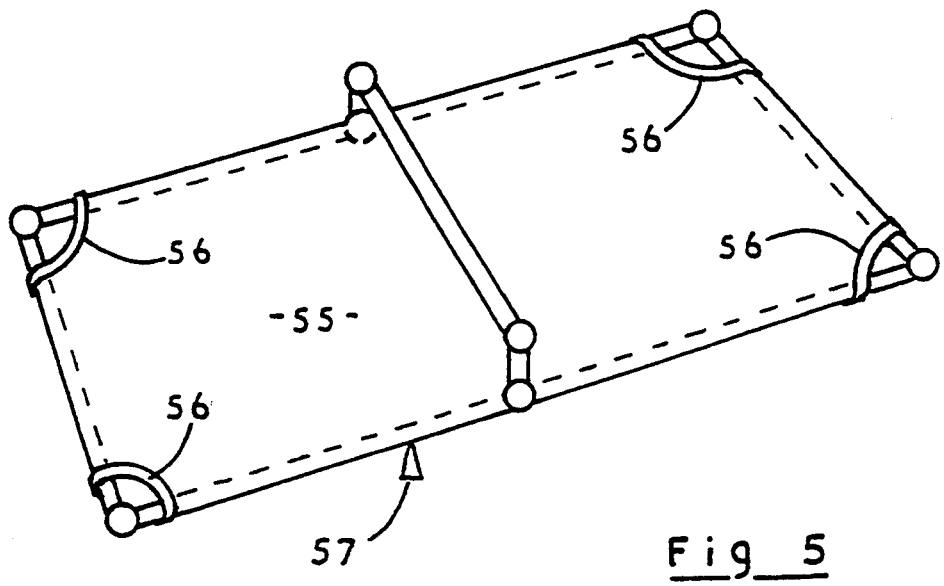
Fig_5
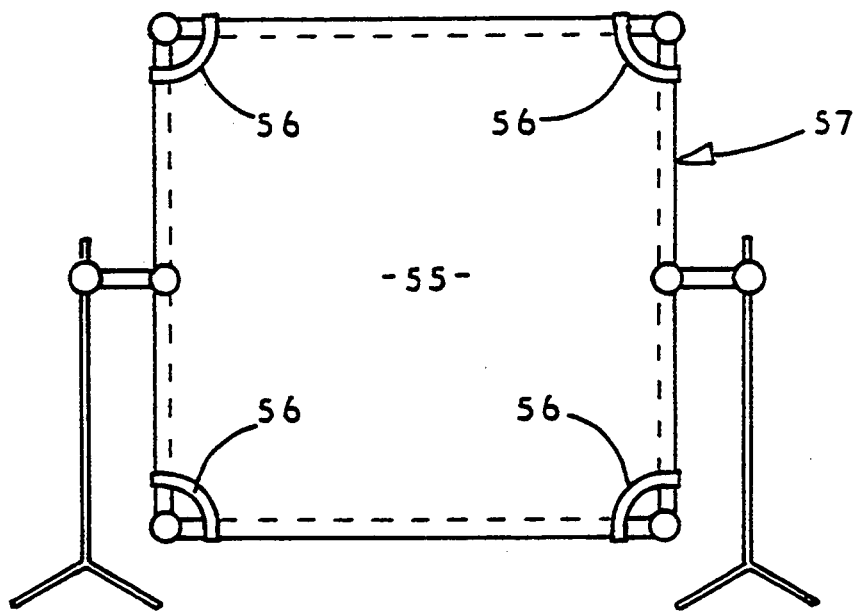
Fig_6

LIGHT PANELS

FIELD OF THE INVENTION

This invention relates to light panels, i.e. to panels used by photographers to ensure that they obtain the required background lighting effects, and to joints used in the production of light panels.

BACKGROUND TO THE INVENTION

The light panels most widely used at present comprise a rectangular framework on which a fabric sheet is mounted, the framework comprising a plurality of tubes through which an elasticated cord is passed. The framework is thus collapsible so as to facilitate transport and storage thereof.

A disadvantage of this design of framework is that, because the tubes are formed of a light-weight plastic material, a tube can quite easily be broken and, once one tube has been broken, the whole framework has to be replaced.

A further disadvantage is that the framework, though collapsible for transport purposes, is of a fixed size and configuration, for example, 1 meter by 2 meters. If, therefore, a photographer wishes to use light panels of a number of different sizes, he or she will have to purchase a corresponding number of frameworks.

It is accordingly an object of the present invention to provide an improved form of light panel.

SUMMARY OF THE INVENTION

According to the present invention there is provided a light panel comprising a framework and a fabric sheet which can be mounted releasably on the framework wherein the framework comprises a plurality of elongated components which are provided at their ends with jointing elements which are such as to enable adjacent components to be connected together releasably either in alignment or at a selected one of a plurality of relatively inclined configurations release of the connected components being effected by the application of manual pressure to a push-button released locking mechanism.

Each of the elongated elements is preferably in the form of a glass-fibre-reinforced plastic tube and the jointing elements at the ends of the plastic tubes preferably include annular coupling components which can be secured together in aligned face-to-face relationship so that the axes of the annuli coincide, the abutting faces of the two annuli being provided with interengagement means which are engageable at a plurality of relative angular positions of the annuli to permit releasable connection of the two components.

Each of the annular coupling components is preferably formed integrally with a socket, the annular component and socket being produced as a one-piece moulded jointing element and the socket being of such size that it receives an end of the glass-fibre-reinforced plastic tuber which end is bonded or otherwise fixed in position within the socket.

The aligned bores of the annular coupling components may receive a plug which is a close fit in said aligned bores and assists in restraining relative twisting movement of the two components and hence assists in holding the two components together. The plug preferably includes the push-button-released locking mechanism.

The plug is preferably in the form of a hollow cylinder with an increased external diameter collar or other projection at one end of the cylinder and the push-button located at the other end of the cylinder, release of the locking action being effected by the application of manual pressure to the push-button axially of the plug.

The push-button may be in the form of a plunger which is spring-loaded outwardly of the plug by spring means which carries a pair of detents which normally project from the plug to provide a locking action, but which are moved inwardly to release the locking action when the plunger is moved inwardly against its spring-loading.

The invention further provides a light panel kit in the form of a plurality of components designed as described above and which can be assembled together in modular form to produce a range of different light panels.

BRIEF DESCRIPTION OF THE DRAWINGS

FIG. 1 is a plan view of a typical frame member for use in the production of a light panel, FIG. 2 is a side view showing the end portions of two such frame members prior to coupling of them together, FIGS. 5 and 6 show typical light panel configurations.

DESCRIPTION OF THE PREFERRED EMBODIMENTS

Figure 3:
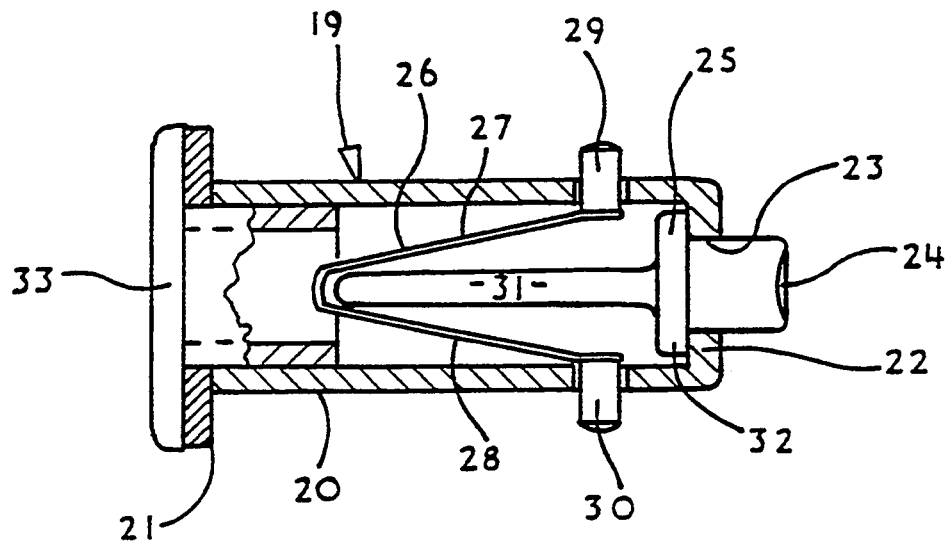
FIG. 3 is a sectional view of a plug for holding the two frame members in coupled relationship.

The frame member 10 shown in FIG. 1 is for use in the production of a light panel in the manner described below. Frame member 10 comprises a hollow tube 11 formed of a glass-fibre-reinforced polyester resin ( or like material ) and a jointing component 12, 13 at each end of the tube. The two jointing components 12 and 13, which are formed as plastic mouldings, are identical and each of them includes a socket 14 into which an end portion of the tube 11 is fitted and bonded in position.

Each of the jointing components 12, 13 also includes a generally annular portion 15 the throughbore of which extends at right angles to the axis of the respective socket 14. Each generally annular portion 15 has a flat face 16 so that, when two frame members are coupled together, the flat face 16 of one jointing component 12 will be in contact with the flat face 16 of another jointing component 13 on the other frame member (see FIG. 2).

Each flat face 16 is formed with a ring of small blind bores 17 and a steel pin 18 is fitted in one bore of each set of blind bores 17. The pin 18 is preferably not fitted in the bore aligned with the axis of the tube 11 but in one of the bores adjacent this aligned bore. The blind bores 17 are equi-angularly spaced about the axes of the throughbores of the annular portions 15 so that, when two components 12 and 13 are coupled together as shown in FIG. 2, the pin 18 of one component can fit in any one of the blind bores 17 of the other component.

The two frame members coupled together in the manner described above can accordingly be located so that the axes of the tubes 11 are located at any one of a large number of relative inclinations. If, for example, the angular spacing between adjacent blind bores is 15° the design of the jointing components can be such that the angle between the axes of the two tubes 11 can be varied between 60° and 180° in increments of 15°. As shown in FIG. 1, the jointing component 12 at one end of the tube 11 faces in the same direction as the jointing component 13 at the other end of the tube 11. If desired, however, the two jointing components 12, 13 at the two ends of the tube 11 may be so bonded to the tube 11 that they face in opposite directions, or at right angles to one another.

After the two components 12 and 13 have been positioned at the required inclination, they are moved towards one another so that component 13 moves, in effect, from the position shown in full lines in FIG. 2 into the position shown in broken lines in FIG. 2. This causes the pin 18 of each component to enter the respective blind bore 17 of the other component and brings the flat faces 16 of the two components into contact with one another. A plug 19 is then fitted in the aligned throughbores of the two annular portions 15 to hold the two components together.

The plug 19 includes a main cylindrical body 20 the diameter of which is such that it is a reasonably close sliding fit in the aligned throughbores of the portions 15 of the two components 12 and 13. At one end, the cylindrical body 20 is provided with an external flange or collar 21 which has a diameter substantially greater than the diameter of the throughbores of the portions 15 and thus acts as a stop to limit the extent of insertion of the plug 19 into the throughbores.

At its other end, the plug body 20 has an inwardly directed lip 22 which surrounds an opening 23 from which there projects the end portion 24 of a push-button or plunger 25. At a position adjacent to, but spaced from, the lip 22, the plug body 20 is formed with a pair of diametrically opposed circular openings.

The push-button 25 carries a U-shaped leaf spring 26 which, in its relaxed condition, has its arms 27 and 28 inclined outwardly away from one another. At the free end of each of the arms 27, 28, there is an outwardly extending pin 29, 30. The arrangement is such that, when the assembly comprising the push-button 25 and the spring 26 is inserted in the bore of the plug body 20, the pins 29 and 30 will be located in, and project outwardly from, the diametrically opposed openings adjacent the lip 22. As shown, the pins 30 are of generally cylindrical form with domed heads, but they could alternatively be of somewhat frusto-conical or tapered form.

The push-button 25 includes a plate-like main body 31 around which the U-shaped spring 26 is fitted and a flange 32 which, when the end portion 24 of the push-button 25 projects its maximum amount through the opening 23, is located in abutting relationship with the lip 22 which thus functions as an end stop for the push-button assembly. When the assembly has been placed within the interior of the plug body 20, the end of the bore in the plug body 20 is closed by means of a stop or bung 33. The stop or bung 33 is fixed in position by, for example, an adhesive or by welding.

When the spring 26 is in its relaxed condition, the end portion 24 of the push-button 25 projects its maximum amount through the opening 23 and the two pins 29 and 30 project through the diametrically opposed openings as shown in FIG. 3. The spacing between the collar 21 and the pins 29 and 30 is very slightly greater than the total thickness of the two generally annular portions 15 when assembled together. It will thus be seen that, by fitting the plug 19 in the aligned throughbores of the two annular portions 15, the joint components will be held firmly together.

When however, manual pressure is applied to the end portion 24 of the push-button 25, the push-button 25 will be moved inwardly of the plug body against the action of the spring 26 and the pins 29 and 30 will be drawn inwardly into the diametrically opposed openings in the wall of the plug body 20. The pins 29 and 30 will thus be disengaged from the annular portion 15 with which they had previously been in abutting engagement and it will then be possible to remove the plug 19 from the aligned throughbores in the annular portions 15 and disassemble the joint.

The physical dimensions of the joint components and the rating of the spring 26 are such that manual pressure is sufficient to release the locking action provided by the outwardly projecting pins 29 and 30. This pressure can conveniently be applied to the end portion 24 of the push-button 25 by the thumb of one hand while the forefinger of that hand rests against the stop or bung 33. Disassembly of the joint can thus be effected in relatively little time.

Although, in the specific arrangement shown in FIG. 3, the end of the bore in the plug body 20 is closed by means of a stop or bung 33, the plug body 20 could itself be connected, as by welding, to a further tube similar to the tube 11. The joint could then be used to interconnect three frame members, with the third frame member, i.e. the frame member connected to the plug 19, arranged with its axis coincident with the axis of the plug body 20 and thus at right angles to the plane containing the axes of the first two frame members.

In the particular arrangement described above with reference to FIG. 3, the length of the plug body 20 is such that it can be used for the connection of one pair of components 12 and 13. However, by extending the length of the plug body 20, two pairs of components can be interconnected. They will be relatively rotatable about the axis of the plug 19, but held against separation axially of the plug.

Figure 4:
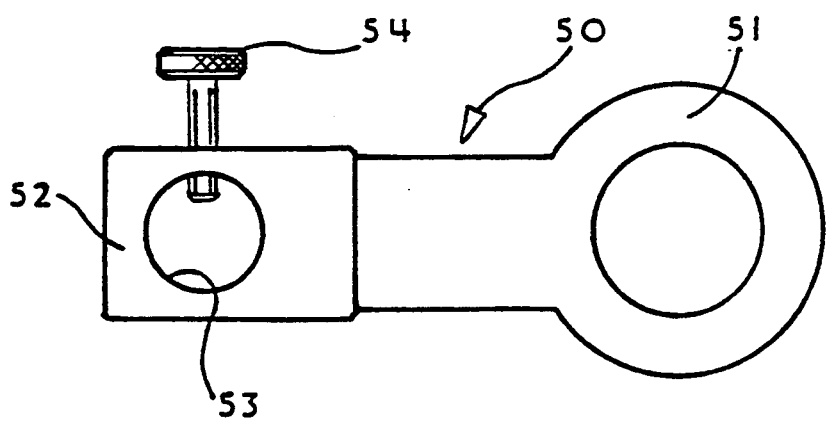
FIG. 4 is a side view of a component for connection to a light stand.

Turning next to FIG. 4, this shows a coupling component 50 which can be used when wishing to mount a light panel on a lighting stand. Component 50 includes an annular portion 51, constructed as described above, and a socket 52 which incorporates a metal insert or is moulded on to a metal insert. The metal insert is in the form of a cylindrical sleeve the axis of which coincides with that of the socket 52. The sleeve has a transverse bore 53 and a clamping screw 54 is carried by the sleeve so that the shank of the screw 54 extends at right angles to the axis of the socket 52 and at right angles to the transverse bore 53. A stem of a lighting stand can then be received within either the socket 52 or the transverse bore 53 and clamped in position.

FIGS. 5 and 6 show typical light panel configurations and, in each case, a rectangular sheet 55 of fabric is provided at each corner with elasticated strips 56 whereby the sheet 55 can be carried releasably on a framework 57 of any suitable configuration produced by fastening together frame members and jointing components as described above. Although the two panel configurations shown in FIGS. 5 and 6 include only right angles, it is to be appreciated that frameworks of many kinds, e.g. hexagonal frameworks, can be produced. It is also to be appreciated that the invention is applicable to the production of three-dimensional structures such as light tents or hides used by photographers when taking pictures of birds.

The same kit of components can be used to produce structures of different shapes and sizes. For example, the components used to produce a 2×2 structure can also be used to produce a 1×3 structure. The only additional item that is required is a backing sheet of the appropriate size.

I claim:

1. A light panel comprising a framework and a fabric sheet which can be mounted releasably on the framework, said framework comprising a plurality of interconnected elongated components and jointing elements at the ends of the elongated components whereby the components can be connected together releasably either in alignment or at a selected one of a plurality of relatively inclined configurations, locking means being provided for holding connected jointing elements together, and push-button-operated means being provided for releasing the locking means whereby release of the connected components can be effected by the application of manual pressure to the push-buttons.

2. A light panel as claimed in claim 1, in which the jointing elements at the ends of the elongated components include annular coupling components which can be secured together in aligned face-to-face relationship so that the axes of the annuli coincide, the abutting faces of the two annuli being provided with interengagement means which are engageable at a plurality of relative angular positions of the annuli to permit releasable connection of the two components.

3. A light panel as claimed in claim 2, in which each of the annular coupling components is formed integrally with a socket, the annular component and socket being produced as a one-piece moulded jointing element and the socket being of such size that it receives an end of the associated elongated component which comprises a glass-fibre-reinforced plastic tube, which end is fixed in position within the socket.

4. A light panel as claimed in claim 2, in which the abutting faces of the annular coupling components are formed with a circular array of bores and at least two pins are provided, the pins having push-fit engagements in the bores to hold the two components against relative rotational movement.

5. A light panel as claimed in claim 2, in which the aligned bores of the annular coupling components receive a plug which is a close fit in said aligned bores and assists in restraining relative twisting movement of the two components.

6. A light panel as claimed in claim 5, in which the plug includes the locking means and the push-button-operated means for releasing the locking means.

7. A light panel as claimed in claim 5, in which the plug is in the form of a hollow cylinder with an increased external diameter collar at one end of the cylinder and the push-button is located at the other end of the cylinder, release of the locking action being effected by the application of manual pressure to the push-button axially of the plug.

8. A light panel as claimed in claim 7, in which the push-button is in the form of a plunger which is spring-loaded outwardly of the plug by spring means which carries a pair of detents which normally project from the plug to provide a locking action, but which are moved inwardly to release the locking action when the plunger is moved inwardly against its spring-loading.

9. A light panel as claimed in claim 8, in which the spring means is a generally U-shaped leaf spring the arms of which extend outwardly away from one another in the free or relaxed condition of the spring, and in which the detents are in the form of pins attached to the ends of the arms of the spring and extend outwardly through diametrically aligned bores in the cylindrical wall of the plug.

10. A light panel for use by a photographer, said light panel comprising a framework and a fabric sheet mounted releasably on the framework, the framework comprising a plurality of elongated components and moulded plastic jointing elements at the ends of the elongated components, each of said jointing elements including an annular portion having a bore and a socket portion formed integrally with the annular portion, the ends of the elongated components being fixed in position within the sockets of the socket portions and the annular portions having generally flat faces, the jointing elements being releasably connectable together with the associated elongated components either in alignment or inclined relative to one another, the flat faces of the annular portions being provided with interengagement means to prevent relative rotation of a pair of connected jointing elements and plug means being provided for fitment in the bores of the annular portions when fitted together in face-to-face engagement, the plug means serving to restrain relative twisting movement of the connected jointing elements.

* * * * *